US00RE34128E

United States Patent [19]

Lorhpipat

[11] E Patent Number: Re. 34,128

[45] Reissued Date of Patent: Nov. 17, 1992

[54] TAKRAW BALL

[76] Inventor: Boonchai Lorhpipat, 42/58 Moo 5, Petchkasaem Road, Raiking, Sampran, Nakornpathom, Thailand

[21] Appl. No.: 738,048

[22] Filed: Mar. 21, 1991

Related U.S. Patent Documents

Reissue of:

[64] Patent No.: 4,813,674
Issued: Mar. 21, 1989
Appl. No.: 71,186
Filed: Jul. 8, 1987

[30] Foreign Application Priority Data

Nov. 5, 1986 [GB] United Kingdom ..... 8626475

[51] Int. Cl.[5] ..... A63B 39/00

[52] U.S. Cl. ..... 273/58 B; 273/58 D; 446/107; 446/120

[58] Field of Search ..... 273/58 B, 58 BA, 327, 273/428, 58 K, 60 B, 58 R, 58 D; 428/11; 446/107, 120

[56] References Cited

U.S. PATENT DOCUMENTS 2,791,868 5/1957 Viken ..... 428/11 X
4,107,870 8/1978 Ausnit ..... 428/11 X

FOREIGN PATENT DOCUMENTS 0003874 12/1985 Thailand .
0000391 6/1986 Thailand .

*Primary Examiner*—George J. Marlo
*Attorney, Agent, or Firm*—William R. Hinds

[57] ABSTRACT

Disclosed herein is a takraw ball comprising hoops woven into a spherical basket, each hoop being formed of an elongate, generally flat strip of plastics material, each strip having one convex side edge of constant radius and the other side edge of sinusoidal undulating profile and being joined by its ends to form a frustoconical hoop; pairs of hoops being arranged with the strip convex side edges opposed in a common plane or in parallel planes and the sinusoidal side edges relatively staggered so that interwoven hoops intersect at the troughs of sinusoidal side edges.

10 Claims, 4 Drawing Sheets

TAKRAW BALL

Matter enclosed in heavy brackets [ ] appears in the original patent but forms no part of this reissue specification; matter printed in italics indicates the additions made by reissue.

This invention relates to an improved takraw ball manufactured from plastics material. Takraw is a game originating in Thailand but played generally throughout South East Asia and the game essentially comprises opposing teams on either side of a chest high net, the players being allowed to use their feet, knees, elbows, shoulders, foreheads, or other parts of their bodies except hands. The most important rule in takraw is that players must pass the takraw ball back and forth among them without letting it touch the ground.

Like balls for football, basketball etc., the takraw ball is spherical in shape. However, what distinguishes a takraw ball from other balls are the method by which it is manufactured and the way it looks. A takraw ball is made by interweaving rattan strips to produce a spherical ball, so it looks like a small spherical basket, which is the literal means of "takraw" in Thai, A thai takraw ball is unique in that it has twenty interweaving cross-overs and twelve corresponding apertures.

A traditional rattan takraw ball is made by first splitting rattan stalk into long strips of 3 to 4 millimeters wide and 3 to 4 millimeters thick. Then these rattan strips are plaited spirally to form a circular band, like a spring coil of 8 to 12 turns. The number of turns will be determined from the width of rattan strips used and the final tightness of the ball required. Newly plaited or woven rattan takraw balls are not round and have to be pressed by big tongs to force the rattan strips to squeeze into each other and form a round ball. It is then treated with coconut oil to prolong storage life.

The quality of a rattan takraw ball depends on rattan quality and the weaving method. Different types and ages of rattan naturally cause wide variation in quality. Tremendous efforts have been spent to control quality by careful selection of rattan, splitting uniform size of strips, etc. However, a wide range of quality of rattan takraw ball does exist. Final balls are then subjected to classification again according to their appearance and quality. This causes difficulties in cost and quality control in the manufacturing process. Rattan takraw balls therefore have a wide range of prices, through their respective real costs are practically the same. Appearance alone is not sufficient for consumers to make a cost effective decision making when buying a takraw ball. Last but not least, the innate property of a rattan takraw ball which refrains beginners from playing takraw, is the hardness of a new takraw ball. It causes pain to players. It must be massaged or in use for some time before it becomes softer. Once it is soft, then this is the signal that it is about time to discard the ball as it will soon lose its resilience and bounce.

Takraw balls woven from strips of plastics material joined at their ends into hoops have been proposed. However, such plastics takraw balls have problems concerning roundness, asymmetry of surface curvature all over the ball and an unreasonably short life when used. These are hindrance to players. That is to say, players cannot, or find it difficult to, control the ball in kicking it to the spot or direction required. This is due to the asymmetry of roundness of the ball, together with the edges of the strips from which the ball is woven having in fin effect on the surface of the takraw ball. This fin effect retards the flow or movement of the ball, because there are more surfaces which increase their resistance. In other words, when it is windy the air current passing through the fins of the ball would affect the direction of flight of the ball and the increase in air resistance slows the air speed of the ball when it has been kicked. Thus, the asymmetrical roundness or surface curvature of this type of plastics takraw ball hinders both the general and the expert players. Moreover, this type of takraw ball has the problem of the hoops easily becoming loose due to detachment of the strip end joints, which are usually made by the use of a pin which can easily loosen on impact of the ball in all directions whilst it is being played.

It is an object of the present invention to provide an improved takraw ball of greater roundness and surface uniformity.

According to the present invention, a takraw ball comprises bands woven into a spherical basket, each band comprising a pair of hoops, each hoop being formed of an elongate strip of plastics material, each strip having one convex side edge of constant radius and the other side edge of sinusoidal undulating profile and being joined by its ends to form a frusto-conical hoop; pairs of hoops being arranged into bands with the strip convex side edges of the pair of hoops of each band being contiguous or adjacent each other in parallel planes and the sinusoidal side edges relatively staggered so that interwoven bands intersect at the troughs of sinusoidal edges.

The frusto-conical hoops, being arranged back-to-back conform more to a spherical shape and the sinusoidal side edge troughs permit hoops to interweave more tightly at cross-overs.

In an embodiment of the present invention, each pair of hoops are separated by an additional hoop formed of an elongate, narrow, flat and straight-side edged strip of plastics material, the additional hoop being inserted centrally between the opposed side edges of each hoop pair thereby to force each hoop pair apart to tighten the weave of the ball. In this embodiment, the opposed side edges are not contiguous, but rather are adjacent each other in parallel planes.

In a further embodiment, the outer face of each strip is chamfered to one side of each trough; to accommodate an overlying, interwoven, strip at a cross-over. Similarly, the sinusoidal side edge of each strip may be asymmetrically notched to one side of each trough; to accommodate an overlying, central hoop at cross-over.

The radius of curvature of the convex side edge of each side strip is proportional to the circumference of the takraw ball and the width of the central strip.

A Thai takraw ball consists of six circular bands interwoven into a spherical basket having twenty cross-overs.

In accordance with the present invention, and for a Thai takraw ball each of the six circular bands is formed of a pair of hoops or a pair of side hoops separated by a central hoop and the sinusoidally profiled side edge of each side strip has five equispaced peaks, providing five equispaced troughs in the formed side hoop.

The outer faces of the side and central strips may be grooved to lend elasticity to the plastics strip material and to control the weight of the ball. Each side strip may have a tooth at one to engage a hole located proximate the other end of the strip in a depression in the outer face shaped to accommodate the toothed strip end and form a flush surface joint. Preferably, each strip is rivetted at its ends.

The inner face of each strip may be grooved or plain and the thickness of the strips may be used to control the weight of the ball.

The above and other features of the present invention are illustrated by way of example in the drawings wherein.

Figure 1:
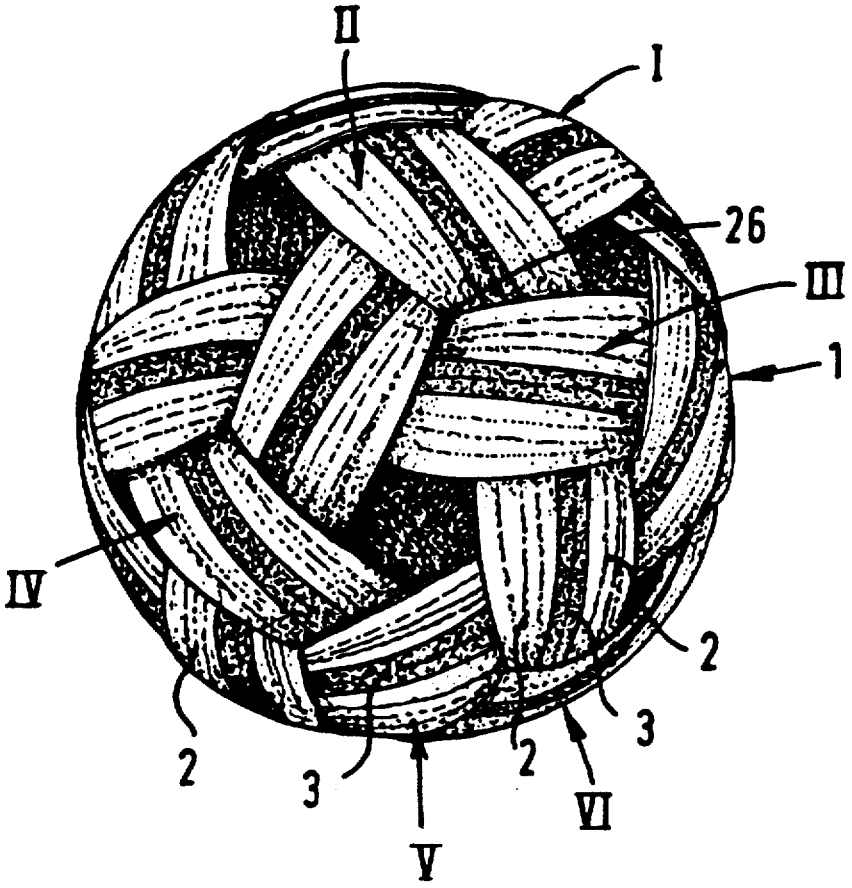
FIG. 1 shows a Thai takraw ball in accordance with the present invention.

As shown by FIG. 1, a Thai takraw ball consists of six bands 1 woven into a spherical basket. The individual bands are designated I through VI in FIG. 1. Each band consists of a pair of side hoops 2 separated by a central hoop 3.

Figure 4A:
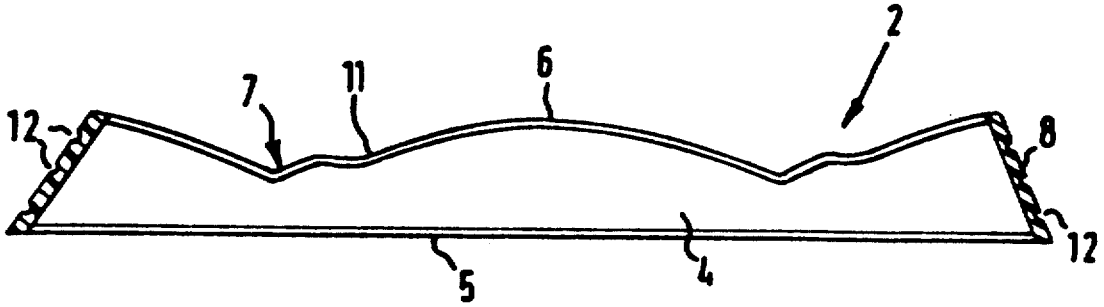
FIG. 4A is a simplified diagrammatic sectional elevation view of a side strip formed into a frusto-conical hoop, with the frusto-conicity exaggerated for purposes of illustration.
Figure 3:
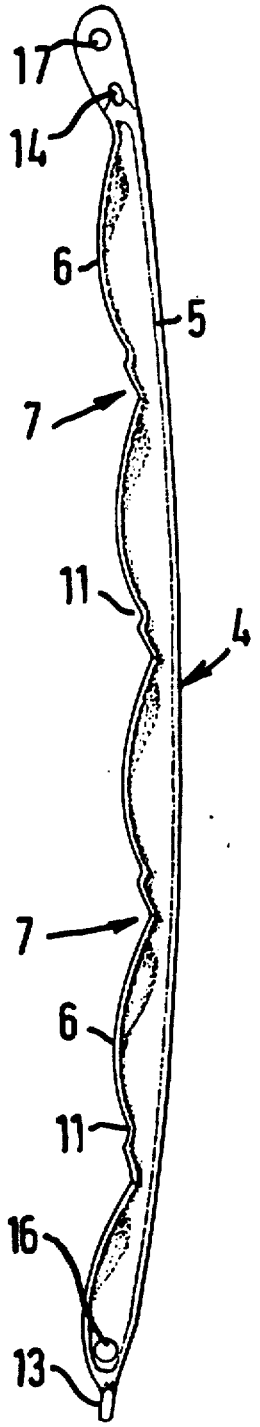
FIGS. 2, 3 and 4 are, respectively, a plan, an underplan, and an edge view of a side strip.
Figure 4:
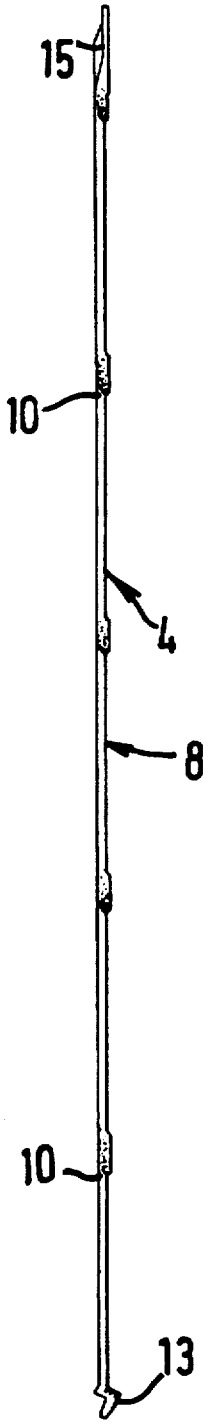
Figure 2:
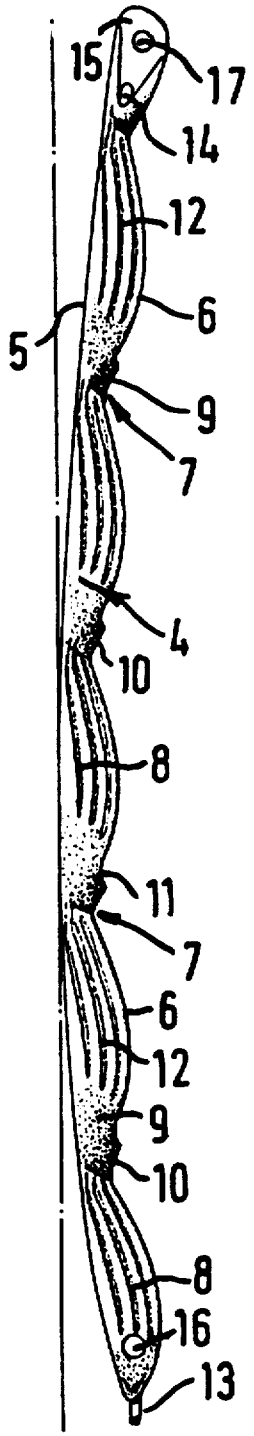

A side hoop is shown by FIGS. 2, 3 and 4 to be formed from an elongate, generally flat strip 4 moulded of suitable plastic material, to have a convex side edge 5 of constant radius and the other side edge of sinusoidally undulating profile having five equispaced peaks 6 and and intervening troughs 7. The upper face 8 of each strip has a chamfered region 9 to one side of each trough: the chamfered region tapering towards the strip edge and towards the trough, where it ends in an abrupt step 10. Each trough is also asymmetric, with a notch 11 to one side thereof. The remainder of the upper face 8 is moulded with a series of intermittent, generally longitudinal grooves 12. As shown in exaggerated form in FIG. 4A, when the ends of a strip 4 are joined form a hoop 2, the hoop is frustro-conical because of the originally convex side edge 5.

One end of the strip tapers to a point from which depends a tooth 13 whilst the other end has a hole 14 located in a depression 15 in the upper face 8; the depression 15 being shaped to accommodate the tooth end of the strip when the tooth 13 is inserted into the hole 14 and leave a flush upper surface to the hoop joint. Rivet holes 16 and 17 are respectively provided proximate each end of the strip.

Figure 5:
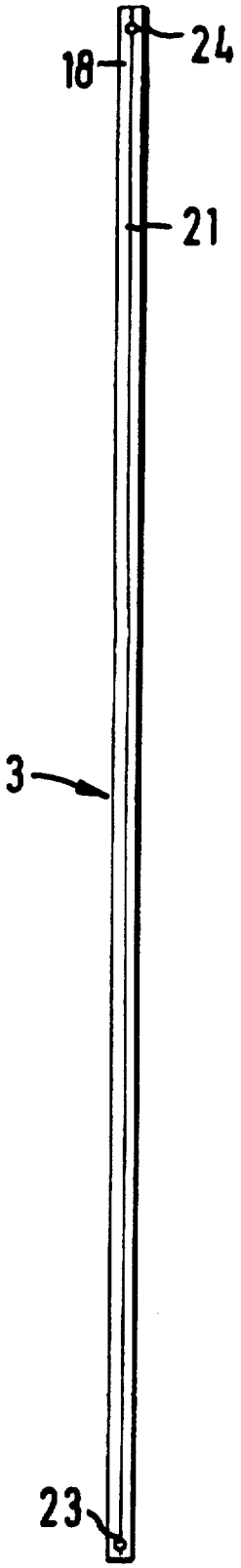
FIGS. 5 and 6 are, respectively, a plan and an underplan of a central strip.
Figure 6:
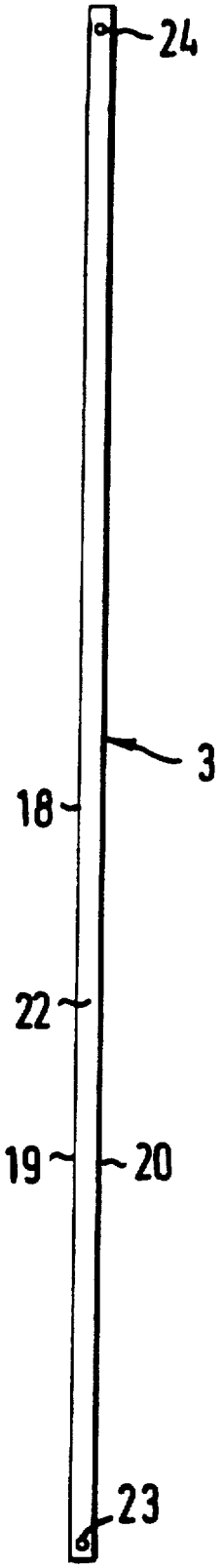

A central hoop 3 is shown by FIGS. 5 and 6 to be formed from an elongate, narrow strip 18 moulded from suitable plastics material to have straight side edges 19 and 20, a longitudinally grooved upper face 21, a plain underface 22 and rivet holes 23 and 24 respectively, proximate each end.

Figure 7:
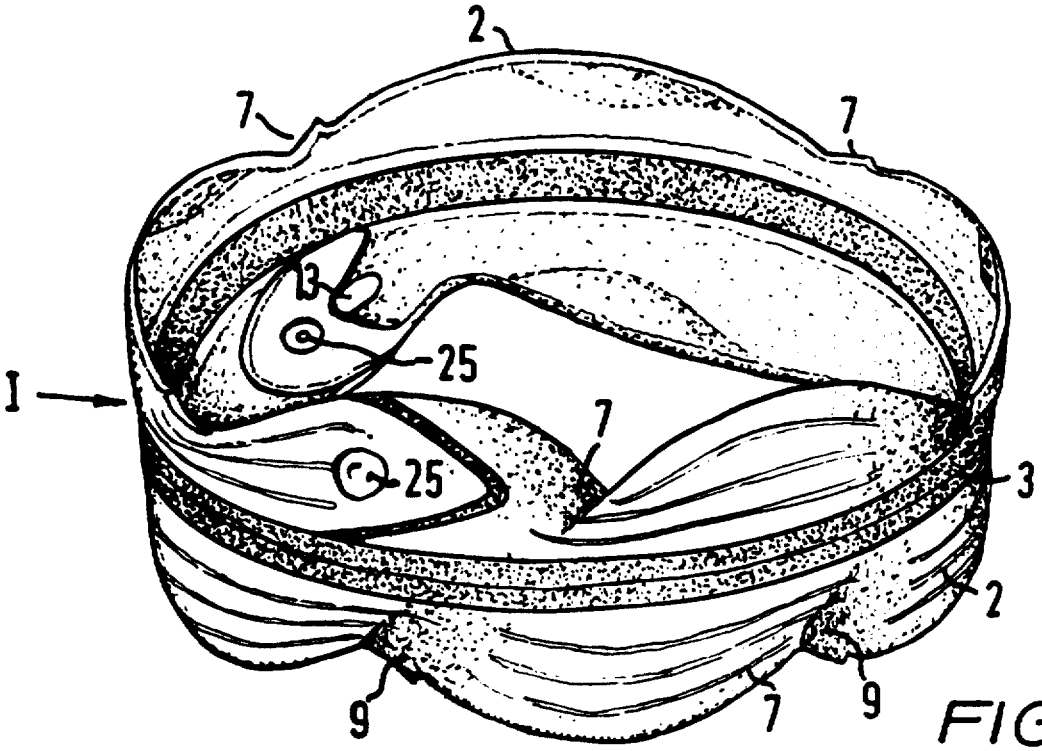
FIG. 7 is a perspective view of an assembled band.

An assembled band I is shown by FIG. 7 to consist of a central hoop 3, formed from a central strip with its ends overlapped and rivetted together and two side hoops 2 each formed from a side strip with a tooth 13 inserted into the receiving hole and the overlapped, flush-surfaced ends permanently joined together by rivets 25. As can be seen, the troughs 7 of one side strip are offset relative to the troughs 7 of the other side strip.

Figure 8:
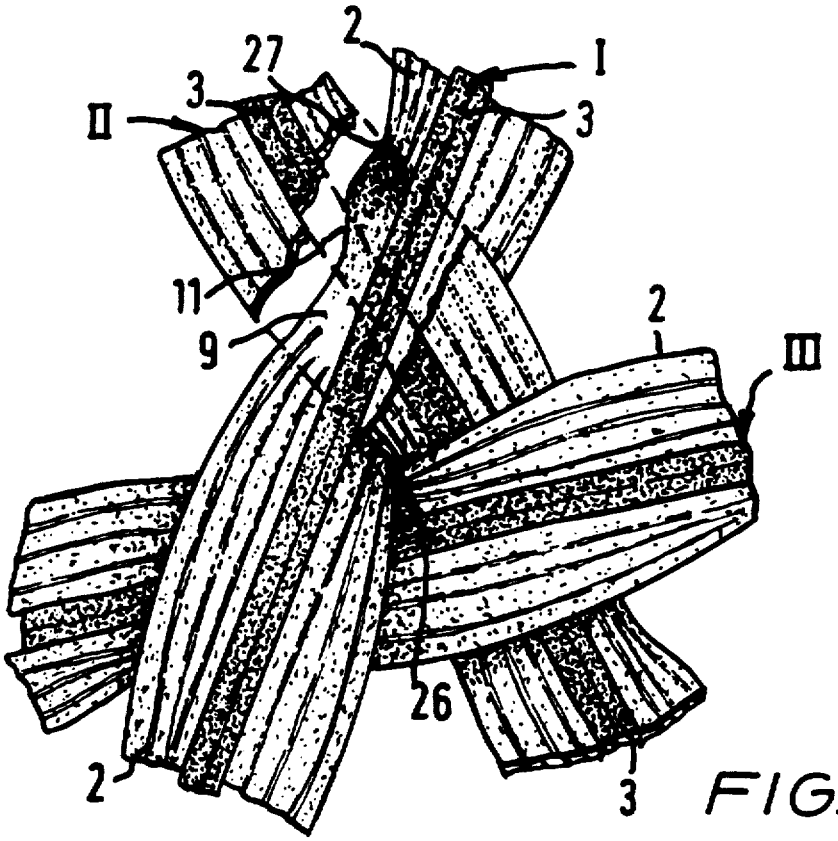
FIG. 8 is a detail showing a cross-over.

As is shown by FIG. 1 and more clearly by FIG. 8, three bands I, II and III are interwoven at a cross-over 26. The troughs 7 of meeting side hoops of bands, I, II and III come together at a single point and it is the meeting troughs in the edges of the side hoops that permit a relatively smooth intersection at this point. Band II is partially broken away in FIG. 8 to show how the band overlies the chamfered region 9 of a side hoop 2 of underlying band I at an adjacent cross-over 27. Additionally, it is shown how a notch 11 in side hoop 2 accommodates the overlying central hoop 3 of band II. Both of these features contribute towards forming a smoother, more general spherical profile to the cross-overs.

An additional feature of the nothces 11 is that they permit, during construction of a ball, a rivet for an underlying central hoop 3 to pass the edge of an overlying side hoop 2; rivetted hoop being rotated until the rivetted joint is hidden under another band.

The weight and size of the takraw ball depends upon the type of sport. For example, for Sepak Takraw the ball weight is fixed at between 160 and 180 grammes and for "Takraw going through the hoops" the weight is fixed at between 180 and 200 grammes. The circumference of an international standard takraw ball is between 40.64 and 43.18 centimeters (16" to 17"). The radius of curvature of the side edge 4 ranges from 500 millimeters to 3000 millimeters and radius of the sinusoidally undulating side edge of 5 peaks each effectively being an arc of radius between 100 and 200 millimeters.

In a takraw ball constructed as described, the overlying interwoven hoops at a cross-over point can be specified to have a distance between the cross-over point and the middle of any of the three adjacent center hoops of between 10 and 15 millimeters.

What I claim is:

1. A takraw ball comprising bands (1) woven into a spherical basket, each band (1) comprising a pair of hoops (2), each hoop (2) being formed of an elongate strip (4) of plastics material, each strip having one convex side edge (5) of constant radius and the other side edge of sinusoidal undulating profile (6, 7) and being joined by its ends to form a frusto-conical hoop (2); pairs of hoops (2) being arranged into bands with the strip convex side edges (5) of the pair of hoops of each band being contiguous or adjacent each other in parallel planes and the sinusoidal side edges (6, 7) relatively staggered so that interwoven bands (1) intersect at the troughs (7) of sinusoidal side edges (6, 7).

2. A takraw ball as claimed in claim 1, wherein each pair of hoops are separated by an additional hoop (3) formed of an elongate, narrow, flat and straightside edged strip (18) of plastics material, the additional hoop being inserted centrally between the opposed side edges of each hoop pair thereby to force each hoop pair apart to tighten the weave of the ball.

3. A takraw ball as claimed in claim 2, wherein the outer face (8) of each side hoop (2) is chamfered to one side (9) of each sinusoidal trough (7), to accommodate an overlying interwoven side hoop (2) at a cross-over (26).

4. A takraw ball as claimed in claim 3, wherein each sinusoidal side edge is asymetrically notched (11) to one side of each sinusoidal trough (7) to accommodate an overlying, central hoop (3) at a cross-over (26).

5. A takraw ball as claimed in claim 4, wherein the outer face (8) of each strip is provided with a longitudinal grooving (12,21) to control the elasticity of the strip and the weight of the ball.

6. A takraw ball as claimed in claim 5, wherein each side strip (2) has at one end a tooth (13) shaped to engage a hole (14), located proximate the other end of the strip in a depression (15) in the outer face (8), the depression being shaped to accommodate the toothed end of the strip and form a flush-surface joint.

7. A takraw ball as claimed in claim 1 and comprising six bands (I–VI) woven into a spherical basket with twenty cross-overs, wherein the sinusoidal undulating profile of each side strip (2) comprises five equispaced peaks (6) and intervening troughs (7).

*8. A takraw ball as claimed in claim 1, wherein the outer face (8) of each side hoop (2) is chamfered to one side (9) of each sinusoidal trough (7), to accommodate an overlying interwoven side hoop (2) at a cross-over (26).*

*9. A takraw ball as claimed in claim 1, wherein each sinusoidal side edge is asymmetrically notched (11) to one side of each sinusoidal trough (7) to accommodate and overlying hoop at a cross-over (26).*

*10. A takraw ball as claimed in claim 1, wherein each side strip (2) has at one end a tooth (13) shaped to engage a hole (14), located proximate the other end of the strip in a depression (15) in the outer face (8), the depression being shaped to accommodate the toothed end of the strip and form a flush-surface joint.*

* * * * *